United States Patent [19]

Turtschan

[11] Patent Number: 4,804,322
[45] Date of Patent: Feb. 14, 1989

[54] DEEP-DRAWING MACHINE FOR MAKING THERMOPLASTIC CONTAINERS

[75] Inventor: Alfons Turtschan, Schwaebisch-Hall, Fed. Rep. of Germany

[73] Assignee: Benz & Hilgers GmbH, Duesseldorf, Fed. Rep. of Germany

[21] Appl. No.: 94,948

[22] Filed: Sep. 9, 1987

[30] Foreign Application Priority Data

Oct. 29, 1986 [DE] Fed. Rep. of Germany ....... 3636767

[51] Int. Cl.⁴ ...................... B29C 51/08; B29C 51/16
[52] U.S. Cl. ................................ 425/117; 425/126.1; 425/127; 425/305.1; 425/397; 425/398
[58] Field of Search ..................... 425/289, 292, 305.1, 425/306, 388, 400, 126 R, 116, 117, 126.1, 127, 383, 397, 398

[56] References Cited

U.S. PATENT DOCUMENTS

| | | | |
|---|---|---|---|
| 3,488,804 | 1/1970 | Butcher | 425/397 |
| 3,684,418 | 8/1972 | Langecker | 425/126 R |
| 3,957,412 | 5/1976 | Lechevallier | 425/126 R |
| 4,134,717 | 1/1979 | Philippon et al. | 425/305.1 |
| 4,335,635 | 6/1982 | Hautemont | 425/126 R |
| 4,394,115 | 7/1983 | Dronet | 425/126 R |
| 4,452,580 | 6/1984 | Dronet | 425/305.1 |
| 4,512,734 | 4/1985 | Dronet et al. | 425/306 |
| 4,591,327 | 5/1986 | Hautemont | 425/306 |

FOREIGN PATENT DOCUMENTS 365028 11/1983 Fed. Rep. of Germany .
1969306 8/1987 Fed. Rep. of Germany .

Primary Examiner—Willard Hoag
Attorney, Agent, or Firm—Klein & Vibber

[57] ABSTRACT

The invention relates to a deep-drawing machine for manufacturing containers out of thermoplastic foil by means of a cutting device which includes a banderole arrangement for manufacturing banderoles, labels or the like and includes inserting such into hollow molds of a forming arrangement. For the purpose of simultaneously inserting a large number of banderoles, labels or the like into the hollow molds and for the additional purpose of an easy access to the banderole arrangement and the forming arrangement, and for the purpose of independently driving these two arrangements, the banderole arrangement together with the cutting device is constructed separately from the forming arrangement and there is provided a transfer arrangement between the forming arrangement and the banderole arrangement in the form of a rotatable dish whose axis of rotation is essentially parallel to the longitudinal axes of the hollow molds.

9 Claims, 4 Drawing Sheets

DEEP-DRAWING MACHINE FOR MAKING THERMOPLASTIC CONTAINERS

BACKGROUND OF THE INVENTION

This invention relates to a deep-drawing machine for producing containers out of thermoplastic foil material with a cutting arrangement having a banderole device for producing of banderoles, labels or the like and inserting the same into a hollow mold which is normally movable with respect to the foil plane of a forming arrangement.

A deep-drawing machine of the afore-described general type is described in German Pat. No. DE 23 65 028. In such a deep-drawing machine the insertion of the banderoles, respectively labels into the hollow mold is effected in such a way t hat a banderole-shaped strip is paid out from a guide roller towards a transport roller and guided through a slit which consists of a fixed knife and a movable knife which is adapted to move in a cutting direction and then through a guide channel into the region of the hollow mold. The transport rollers and the fixed knife are mounted on a support structure which in turn is supported on the top of the machine frame. The movable knife is actuated by means of a hydraulically or pneumatically operating cylinders. The guide channel is secured to a slidable transfer support. The transfer support is, in turn mounted on slidable guides which are in turn secured to a frame and a transfer support, and the slidable guides are movable between a position in which the inlet of the guide channel is disposed in the vicinity of the cutting arrangement in a position in which the outlet of the guide channel is disposed in the vicinity of a tangential slit of the hollow mold, and this movement by the guides is reciprocatory. The drive for the reciprocating movement of the guide channel is formed by an hydraulic or pneumatic working cylinder, which is secured to the machine frame and is connected to toggle levers of which one is secured to the transfer support and the other one to the frame. A deep-drawing machine with a banderole arrangement of the afore-described type requires a substantial energy supply (see, for example, German Pat. No. DE 23 65 028) for inserting the banderoles labels and the like in the hollow mold, particularly in view of the fact that the labels are inside the hollow mold held by a winding mandrel which is usually rotatably mounted and axially movable with respect to the hollow mold and operates by means of a source of vacuum which vacuum is controlled in the inner wall of the hollow mold. By means of the direct mounting of the banderole device for the molding means both arrangements are poorly accessible and cannot be driven independently from each other, so that if there occurs a malfunctioning in the cutting arrangement for the banderole device, the deep-drawing machine must be completely stopped.

SUMMARY OF THE INVENTION

It is a general object of this invention to provide an arrangement of the afore-described type by means of which simultaneously a comparatively large number of banderoles, labels and the like, are rapidly and securely introduced into the hollow mold of a molding arrangement and which further assures that the banderole arrangement is, on the one hand, and the molding arrangement is, on the other hand, easily accessible so that these two arrangements are driven independently from each other.

This object of the invention is attained by constructing the banderole arrangement with the cutting device separately from the molding arrangement and that between the latter and the banderole arrangement a transfer device is provided. The invention provides means for a deep-drawing machine by means of which a row of banderoles, labels or the like can be preformed in a plurality of rows one after the other in such a way that they are fed to the transfer arrangement and from this arrangement are transported into the region of the hollow molds of the hollow arrangement, wherein the banderoles also are simultaneously transferred into the hollow molds of the forming arrangement in a particularly rapid and secure manner. In particular this type of banderole fabrication and transfer into the hollow mold is only suitable when a plurality of juxtaposed rows of hollow molds are to be supplied with banderoles, but also bring about simultaneously the advantage that, on the one hand, the forming arrangement and, on the other hand, the banderole arrangement are easily accessible, so that if any malfunctionings occur in one or the other arrangement, they can be rapidly and easily removed. Above all, the deep-drawing machine can continue to operate when the cutting device, for example, malfunctions in the banderole arrangement.

A particularly advantageous construction of the invention is embodied in the transfer arrangement. This arrangement includes a rotatable dish which rotates about an axis which is substantially parallel to the longitudinal axis of the hollow molds. A transfer arrangement of the afore-described type makes it possible for the rotatable dish to assume various stop positions. Thus, in a first stop position the banderoles are received by an arrangement of the banderole arrangement, whereas in a second stop position the banderoles are oriented with respect to their height, and in a third stop position the banderoles are delivered to the hollow molds of the forming arrangement and in a fourth stop position, disposed between the forming arrangement and the tasking arrangement, they are driven by a step switching drive synchronously with the operative movement of the tasking arrangement and the forming arrangement. This results in that when from one side banderoles are fed into the hollow molds, or the opposite side new banderoles are supplied to the rotatable dish, the banderoles are simultaneously oriented in an intermediate position that is disposed between the two previously described positions. By means of such a step-switching transport movement it is possible to simultaneously preform a large number of banderoles, to orient them and to deliver them to the hollow molds, so that a deep-drawing machine which is armed with such an arrangement has an exceptional large manufacturing output.

The rotatable dish has receiving openings for transporting the banderoles, the diameter of which is advantageously larger than the diameter of rotatable and axially relatively adjustable winding mandrels of the tasking arrangement. The receiving openings of the rotatable dish can be oriented by means of the step-switching drive exactly with the hollow forms of the forming tool, so that the receiving openings form to some extent the other part of the entire mold. Moreover, the rotatable dish is slidably axially displaceable relative to the tasking arrangement for receiving the banderoles from the tasking arrangement. This signifies that simultaneously a slidable displacement of the rotatable dish together with the undertool in the direction of the to be formed thermoplastic foil, respectively the upper forming tool, occurs.

A particularly compact and accessible type of construction for the rotatable dish results from this dish being formed as a multi-arm rotatable cross and that thereby the receiving openings are arranged in the region of the rotatable cross-arms.

An arrangement of the afore-described type can be particularly easily loaded in a manner wherein the tasking arrangement is armed with a cutting device required for the transverse cutting on the opposite sides of the rotatable cross arms which are to be loaded with the banderoles and is provided with identically constructed loading arrangements, each one of which is provided with longitudinal cutting device and the cutting device for the required transverse cutting.

BRIEF DESCRIPTION OF THE DRAWINGS

The foregoing objects and arrangement will be described hereinafter in conjunction with the following detailed description and the appended drawings, in which.

DETAILED DESCRIPTION

Figure 1:
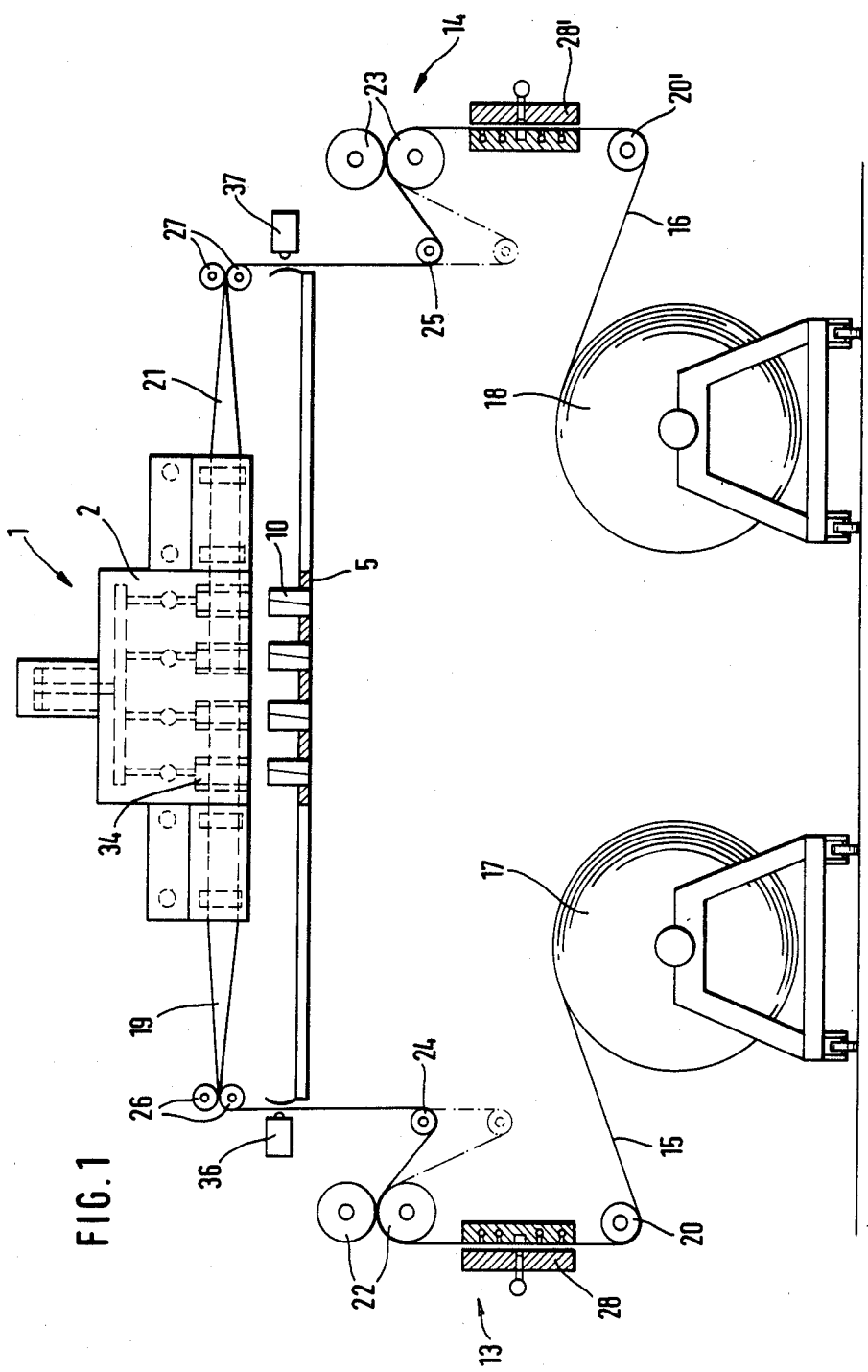
FIG. 1 is a front-elevational view of a banderole arrangement which is provided with bilaterally arranged loading mechanisms.
Figure 2:
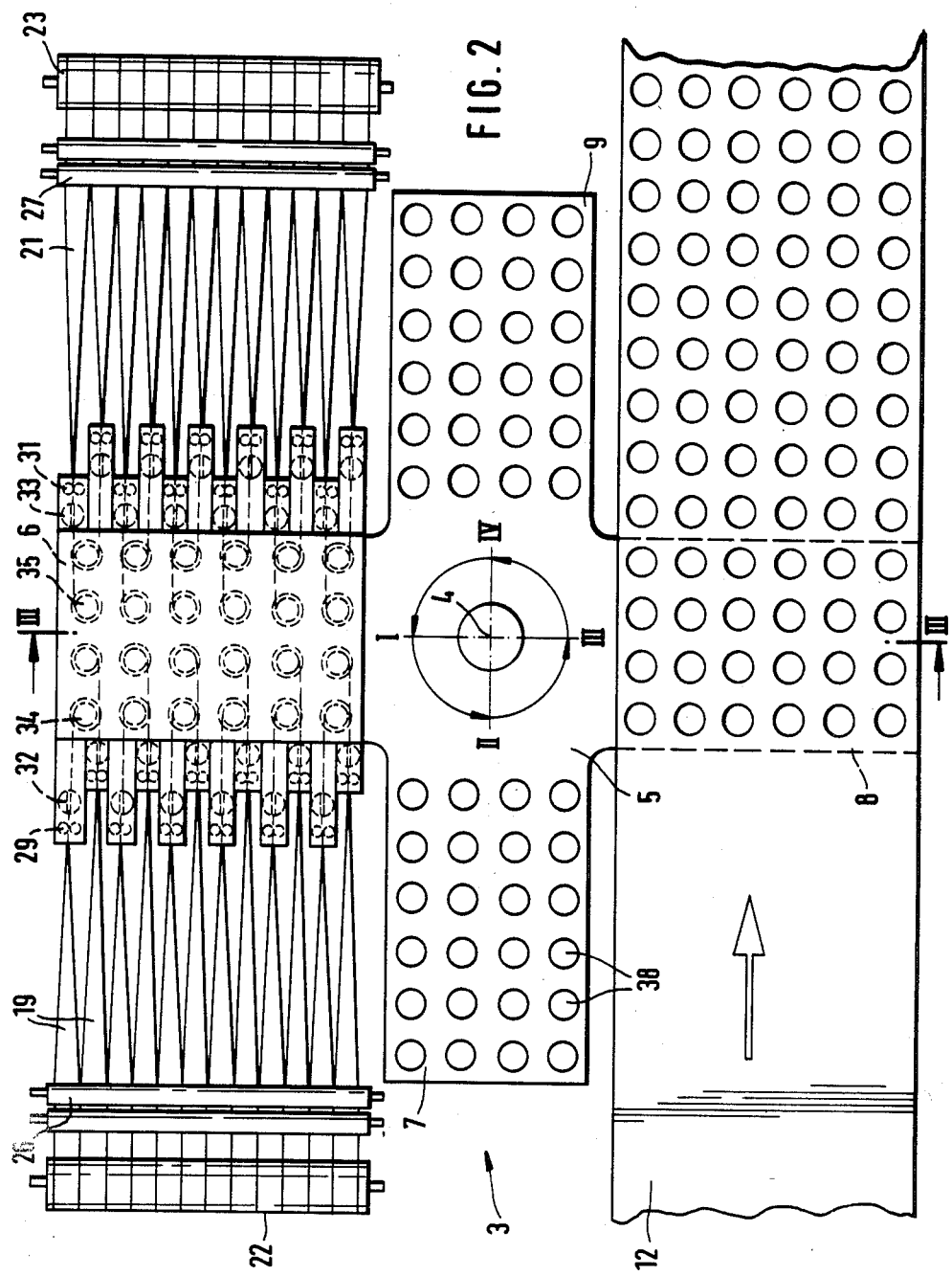
FIG. 2 is a plan view of the arrangement illustrated in FIG. 1.
Figure 3:
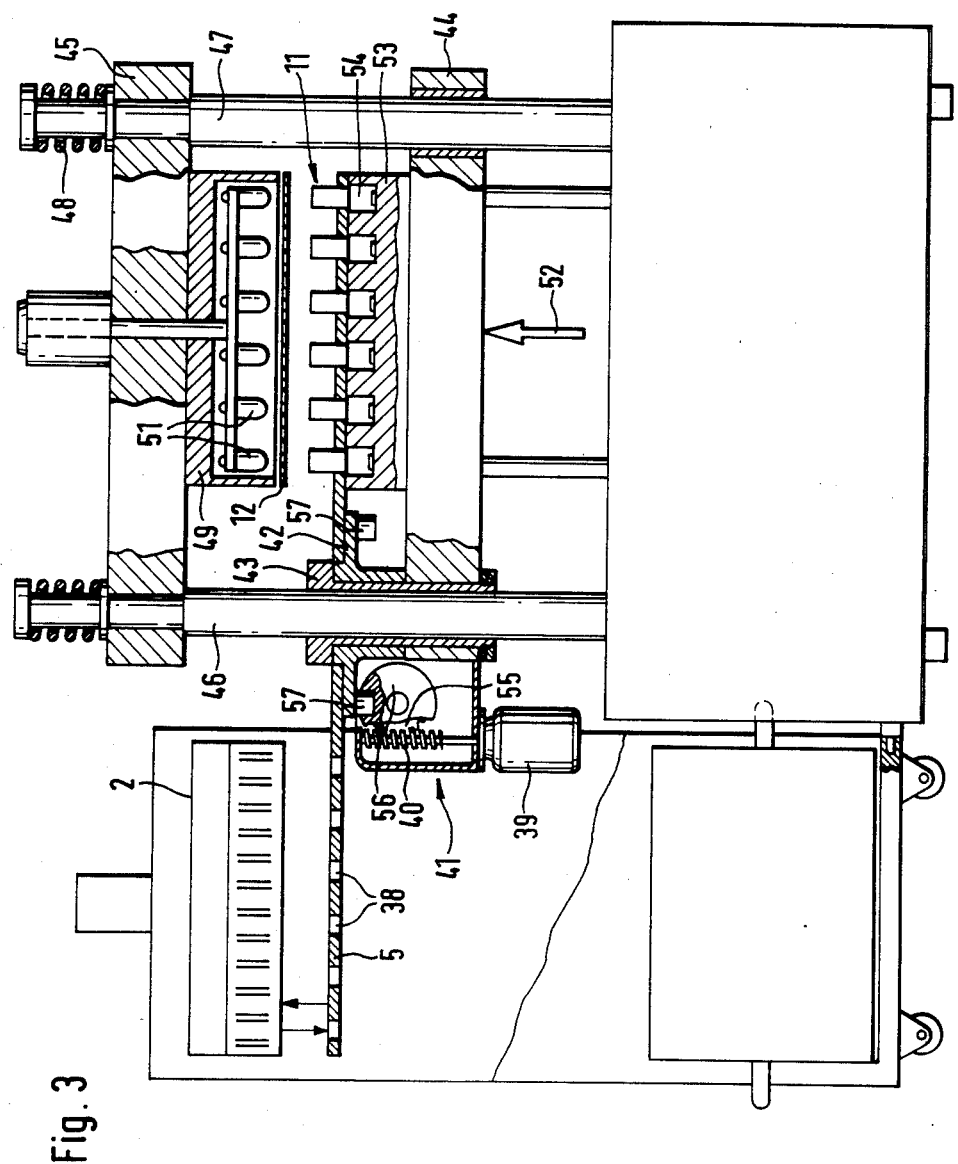
FIG. 3 is a side-elevational view, partially in cross-section along line III—III of FIG. 2.

The banderole arrangement 1 in FIGS. 1 and 2 is not illustrated in detail. A tasking arrangement 2, respectively a holding arrangement for preformed banderoles is operatively connected to the banderole arrangement 1. In addition to the tasking arrangement 2 there is provided for the preformed banderoles a transfer arrangement 3 which transfer arrangement 3 takes the form of a dish 5 which is rotatable about the axis 4. This rotatable dish 5 is shown in FIG. 2 as having four rotating cross-arms 6, 7, 8, 9. The rotatable dish 5 operates in synchronism with the deep-drawing machine and extends into a region of a forming arrangement 11, illustrated in FIG. 3, which will be described in further detail hereinafter. In the region of this forming arrangement there is transported in a substantially horizontal plane a foil 12 of suitable thermoplastic material for manufacturing containers. As can be seen from FIG. 2 the foil 12 moves relative to the rotatable axis 4 of the rotatable dish 5 from one side to opposite side of the tasking arrangement 2. As is particularly well illustrated in FIG. 1, the opposite sides of the tasking arrangement 2 are provided with loading devices 13, 14. These loading devices serve to feed banderole strips 15, 16 from banderole supply rolls 17, 18 via guide rollers 20, 20' to the tasking arrangement 2, and that is in the form of a plurality of juxtaposed longitudinal strips 19, 21. Two cutting rollers 22, 23 are provided for the manufacture of the longitudinal strips, whereby the longitudinal strips are guided via floating rollers 24, 25 and guide rollers 26, 27. The banderole strips are further guided along a cutting arrangement 28, 28' for a rapid exchange of rollers. The longitudinal strips 19, 21 are deviated 90° behind the deviation guide rollers 26 and are in this manner guided to drive rollers 29, 31 and directly to the cutting knives 32, 33, which are disposed behind the drive rollers 29, 31. The corresponding adjoining contacting drive rollers 29, respectively cutting knife 32, respectively 33 are offset with respect to each other in such a way that the length of the cut banderoles, respectively labels, are at all times guided tangentially to opposite sides of the winding mandrels 34, 35. In this manner a plurality of banderoles, respectively labels, can be guided into a very compact space. The precise length of the cut banderoles is controlled by means of photo-cells 36, 37 or equivalent arrangements. The winding of the banderole onto the winding mandrels 34, 35 is effected by means of a vacuum source.

The transfer of the banderoles from the tasking arrangement 2 onto the rotatable dish 5 is effected by means of the receiving openings 38 that are disposed in the rotating cross-arms 6, 7, 8, 9 of the rotating dish, by means of which openings the banderoles 10, which have been delivered by the winding mandrels 34, 35 ,are further transported.

As can be noted from FIG. 2, the rotatable dish 5 can be moved into four different stop positions. In the stop position 1 the banderoles are transferred from the tasking arrangement 2 onto the rotatable dish 5, whereas in the stop position 11, which is angularly spaced 90° from the stop position 1, the banderoles are oriented in their height by means of a non-illustrated orienting arrangement within the receiving openings 38 of the rotatable dish. Finally, the banderoles are transferred from the rotatable dish 5 to the forming arrangement 11 in the stop position 111. The stop position IV is an empty position and is disposed between the stop position III and the stop position I. As can be noted from FIG. 3, the drive of the rotatable dish 5 is effected by means of a drive motor 39 via an intermediate switchings by way of a worm drive having a worm 4 and a worm wheel 55 as well as a step-switching drive 41, provided with a cam disc 56 and roller 57 which coacts with the cam disc 56. The cam disc 56 and roller 57 are connected to the underside of t he support sleeve 42. This support sleeve 42 is in turn mounted on a bushing 43. The rotatable dish 5 is disposed with one rotatable cross-arm between a lower support plate 44 and an upper support plate 45. These support plates are mounted on guide columns 46, 47. The upper support plate 45 is biased downwardly by way of a pair of coil springs 48. The support plate 45 has mounted on its underside a tool 49 which is downwardly biased by the plate 45 and has a plurality of juxtaposed forming stamps 51 mounted therein, whereas the lower support plate 44, which is movable in the direction of the arrow 52, serves to support a lower forming tool 53 with hollow molds 54 of shapes that mate with the forming stamps 51.

The rotatable dish together with the forming tool can be exchanged for affixing different banderoles.

MANNER OF OPERATION

Figure 4:
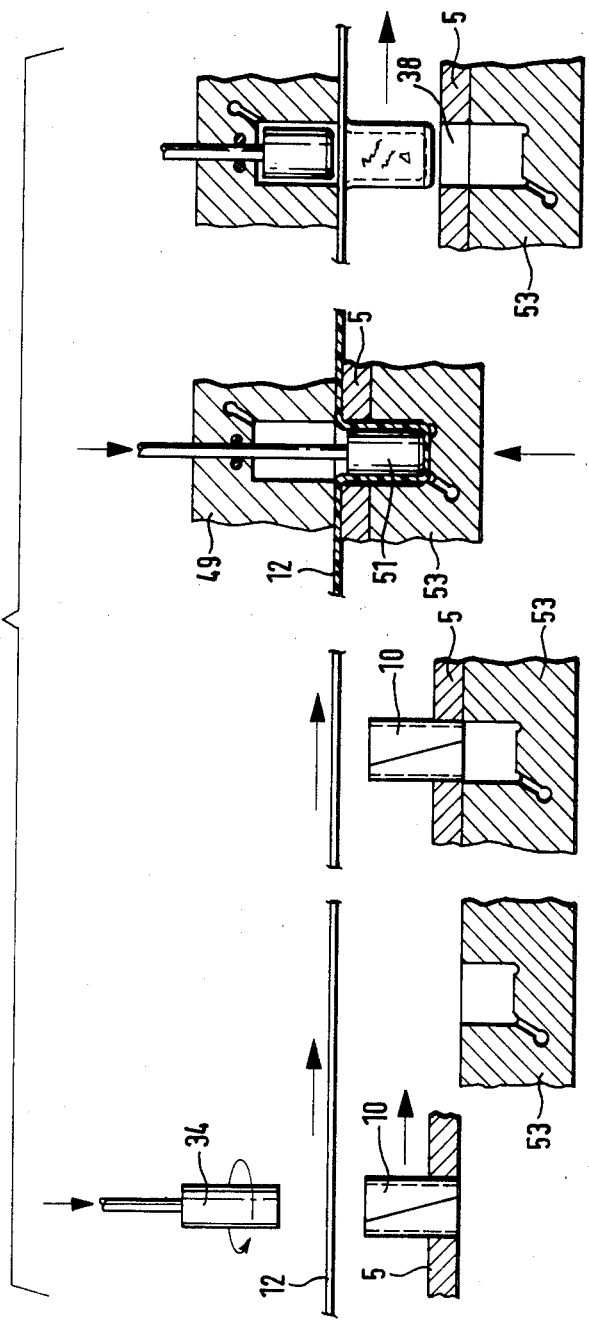
FIG. 4 is a schematic illustration in the form of an explosive view illustrating various operational steps showing the banderole transfer and container-forming of the arrangement.

Since the feeding arrangements 13, 14 are completely identical, there will be described hereinafter only the operation of the left portion of FIG. 1 in which the feeding arrangement 13 is illustrated. The wound supply roll 17 pays out the banderole strip via the cutting rollers 22. Thereby the banderole foil material 15 is cut into a plurality of longitudinal strips 19, the control of which is effected by way of the floating roller 24. The banderole strips 19 are thereafter, as illustrated in FIG. 2, guided with the aid of the drive rollers 29 to the cutting knives 32, where with the aid of the photocell 36 the banderole strips are transversely cut, so that banderoles of corresponding length are formed. These banderoles are thereafter, as can be observed from the schematic illustration of FIG. 4, guided to the winding mandrel 34 and with the aid of a source of vacuum are wound on the winding mandrel 34 and are in this way preformed. The rotating dish 5 is then moved upwardly up to the underside of the tasking arrangement 2. Thereafter the preformed banderoles are transferred by means of an axial displacement of the winding mandrels 34, whose diameter is smaller than that of the receiving opening 38 of the rotatable dish 5, with the aid of a not further illustrated driving arrangement to the receiving openings 38 of the rotating dish 5. Thereafter the rotating dish 5 is moved from the stop position I into the stop position II, wherein the banderoles are oriented by means of a not illustrated orientation mechanism in their height. Whereafter the banderoles are moved into the region of the forming arrangement, and that is in such a way, that the receiving openings 38 of the rotatable dish 5 are oriented with the hollow molds 54 of the forming arrangement 11. Thereby the receiving openings 38 form a portion, that is the upper portion, of the lower forming tool 53. In view of the fact that in this position of the rotatable dish 5 the opposite side of the dish 5, that is at the side of the stop position I, new banderoles are again received, the rotatable dish is entrainingly lifted, so that the banderoles come to rest with their upper sides on the underside of the thermoplastic foil 12. Simultaneously, the forming stamp 51 is moved downwardly by means of its corresponding drive and by way of the introduction of pressurized air the container is formed. Thereby there is simultaneously sealingly affixed the banderoles to the outer side of the so fabricated container. Thereafter the forming tools are again retracted, respectively the rotatable dish 5 is moved downwardly, via the stop position IV into the stop position I, for the purpose of receiving in that latter position again new banderoles, which have in the interim been preworked in the tasking arrangement 2.

Although the invention has been illustrated in the accompanying drawings and described in the foregoing specification, it is to be especially understood that various changes, such as in the relative dimensions of the parts. materials used, and the like, as well as the suggested manner of use of the apparatus of the invention, may be made therein without departing from the spirit and scope of the invention, as will now be apparent to those skilled in the art.

I claim:

1. In a deep-drawing machine for manufacturing containers out of thermoplastic foil material having banderole dispensing means which include cutting means for producing banderole strips, labels or the like and inserting same into reciprocally movably mounted hollow molds of a molding arrangement whose reciprocal movement is substantially perpendicular to the plane of said thermoplastic foil material, an improvement comprising, said banderole dispensing means and cutting means being separately arranged from said molding arrangement; and transfer means being operatively mounted in said deep-drawing machine between said molding arrangement, on the one hand, and said banderole dispensing means and said cutting means, on the other hand;

said transfer means include a dish which is rotatably mounted in said deep-drawing machine, the axis of rotation of said rotatable dish is substantially parallel to the longitudinal axes of the hollow molds of said molding arrangement.

2. The improvement in a deep-drawing machine as set forth in claim 1, wherein said rotatable dish is adapted to assume four stop positions, in a first one of said stop positions said banderole strips are being received by a tasking arrangement which is operatively mounted in said deep-drawing machine, in a second one of said stop positions said banderole strips are oriented with respect to their height, in a third one of said stop positions said banderole strips are being transferred to said hollow molds, and a fourth one of said stop positions is disposed between said tasking arrangement and a forming arrangement, and including a step switching drive mechanism being drivingly connected to said tasking arrangement and said forming arrangement.

3. The improvement in a deep-drawing machine as set forth in claim 2, wherein said rotatable dish has a plurality of receiving openings for transporting preformed banderole strips.

4. The improvement in a deep-drawing machine as set forth in claim 3, wherein said rotatable dish is axially slidably movably mounted in said deep-drawing machine relative to said tasking arrangement.

5. The improvement in a deep-drawing machine as set forth in claim 4, wherein said rotatable dish is in the form of a multi-arm rotatable cross and wherein said receiving openings are disposed in the arms of said rotatable cross.

6. The improvement in a deep-drawing machine as set forth in claim 5, wherein an arm of said rotatable cross has banderole strips bilaterally delivered thereto by means of said banderole dispensing means and said cutting means, the later two means are mounted on opposite sides of said arm of said rotatable cross.

7. The improvement in a deep-drawing machine as set forth in claim 6, wherein each one of said banderole dispensing means include a banderole foil supply roll rotatably mounted on a horizontal axis, said banderole foil supply roll dispensing foil material via first guide roller means to said cutting means and said cutting turning and means dispensing said banderole strips via second guide roller means into a vertical plane and feeding them to said tasking arrangement.

8. The improvement in a deep-drawing machine as set forth in claim 7, wherein said tasking arrangement includes rotatable and relatively axially movably mounted winding mandrels.

9. The improvement in a deep-drawing machine as set forth in claim 8, wherein said cutting means include a plurality of cutting devices and a corresponding plurality of pairs of feed rollers, each cutting device and co-acting pair of feed rollers is offset with respect to the adjacent cutting device and pair of feed rollers in such a way that the banderole strips respectively cut by said adjacent cutting devices are fed tangentially to the co-acting winding mandrels.

* * * * *